(12) United States Patent
Wang et al.

(10) Patent No.: US 12,423,382 B2
(45) Date of Patent: Sep. 23, 2025

(54) METHOD, ELECTRONIC DEVICE, AND COMPUTER PROGRAM PRODUCT FOR DATA PROCESSING

(71) Applicant: EMC IP Holding Company LLC, Hopkinton, MA (US)

(72) Inventors: Zijia Wang, WeiFang (CN); Jiacheng Ni, Shanghai (CN); Wenbin Yang, Shanghai (CN); Zhen Jia, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 1023 days.

(21) Appl. No.: 17/397,518

(22) Filed: Aug. 9, 2021

(65) Prior Publication Data

US 2023/0028860 A1   Jan. 26, 2023

(30) Foreign Application Priority Data

Jul. 23, 2021 (CN) .......................... 202110839222.2

(51) Int. Cl.
  *G06F 17/16* (2006.01)
  *G06F 18/213* (2023.01)
  *G06F 18/214* (2023.01)

(52) U.S. Cl.
  CPC ............ *G06F 18/214* (2023.01); *G06F 17/16* (2013.01); *G06F 18/213* (2023.01)

(58) Field of Classification Search
  CPC ....................................................... G06F 17/16
  See application file for complete search history.

(56) References Cited

U.S. PATENT DOCUMENTS

| 2015/0356461 A1* | 12/2015 | Vinyals | G06N 3/084 |
| | | | 706/12 |
| 2019/0272468 A1* | 9/2019 | Feinberg | G06N 3/08 |
| 2022/0092037 A1* | 3/2022 | Alvarez-Melis | G06F 16/35 |

(Continued)

OTHER PUBLICATIONS

N.Marudachalam, M.Ramakrishnan, N.Marudachalam, Comparision on Different Data Transformation, International Journal of Scientific & Engineering Research vol. 8, Issue 10, Oct. 2017, ISSN 2229-5518, p. 380-387. (Year: 2017).*

(Continued)

*Primary Examiner* — Emily E Larocque
*Assistant Examiner* — Markus Anthony Villanueva
(74) *Attorney, Agent, or Firm* — Ryan, Mason & Lewis, LLP

(57) ABSTRACT

Embodiments disclosed herein include a method, an electronic device, and a computer program product for data processing. The method includes determining a first set of feature vectors representing samples in a data set. The method also includes generating a second set of feature vectors by performing a first transformation on the first set of feature vectors, wherein distribution skewness of the second set of feature vectors in a feature space is smaller than that of the first set of feature vectors. The method also includes generating a third set of feature vectors by performing a second transformation on the second set of feature vectors, wherein the third set of feature vectors and the second set of feature vectors have different distances between vectors. The method also includes selecting target samples as representatives from the samples based on a distribution of the third set of feature vectors in the feature space.

20 Claims, 5 Drawing Sheets

(56) References Cited

U.S. PATENT DOCUMENTS

| | | | |
|---|---|---|---|
| 2022/0253704 A1* | 8/2022 | Cubuk | G06N 3/08 |
| 2022/0318557 A1* | 10/2022 | Mohseni | G06V 20/56 |
| 2022/0375602 A1* | 11/2022 | Jaber | G06V 10/454 |
| 2024/0185829 A1* | 6/2024 | Wang | G10L 13/02 |

OTHER PUBLICATIONS

Anonymous, manipulating distance between two vectors—Stack Overflow, Stack Overflow, https://stackoverflow.com/questions/14882923/manipulating-distance-between-two-vectors, Feb. 14, 2013. (Year: 2013).*

Anonymous, euclidean geometry—Reduce distance between two points by %—Mathematics Stack Exchange, Mathematics Stack Exchange, https://math.stackexchange.com/questions/1234824/reduce-distance-between-two-points-by, Apr. 14, 2015. (Year: 2015).*

Editorial Team, How, When, and Why Should YouNormalize / Standardize / Rescale Your Data?, Towards AI Inc. https://towardsai.net/p/data-science/how-when-and-why-should-you-normalize-standardize-rescale-your-data-3f083def38ff, May 28, 2020. (Year: 2020).*

Ronghui Zhan and J. Wan, "Neural network-aided adaptive unscented Kalman filter for nonlinear state estimation," in IEEE Signal Processing Letters, vol. 13, No. 7, pp. 445-448, Jul. 2006, doi: 10.1109/LSP.2006.871854. (Year: 2006).*

T. Wang et al., "Dataset Distillation," arXiv:1811.10959v3, Feb. 24, 2020, 14 pages.

I. Sucholutsky et al., "Improving Dataset Distillation," arXiv:1910.02551v1, Oct. 6, 2019, 19 pages.

S. Yang et al., "Free Lunch for Few-shot Learning: Distribution Calibration," arXiv:2101.06395v2, Mar. 15, 2021, 13 pages.

Y. Xian et al. "Feature Generating Networks for Zero-Shot Learning," arXiv:1712.00981v2, Apr. 12, 2018, 10 pages.

R. Salakhutdinov et al. "One-Shot Learning with a Hierarchical Nonparametric Bayesian Model," Workshop on Unsupervised and Transfer Learning, vol. 27, 2012, pp. 195-207.

D. Zhabinskaya et al., "Force and Potential Energy," https://phys.libretexts.org/Under_Construction/Purgatory/2%3A_Applying_Models_to_Mechanical_Phenomena/2.5%3A_Force_and_Potential_Energy, Jun. 2019, 5 pages.

J. W. Tukey, "Exploratory Data Analysis," Addison-Wesley Publishing Company, 1977, 711 pages.

L. E. Peterson, "K-nearest Neighbor," http://www.scholarpedia.org/article/K-nearest_neighbor, Scholarpedia, vol. 4, No. 2, 2009, 12 pages.

E. A. Wan et al., "The Unscented Kalman Filter for Nonlinear Estimation," Proceedings of the IEEE 2000 Adaptive Systems for Signal Processing, Communications, and Control Symposium, 2000, 6 pages.

E. A. Wan et al., "The Unscented Kalman Filter," Kalman Filtering and Neural Networks, Chapter 7, 2001, 50 pages.

I. Radosavovic et al., "Data Distillation: Towards Omni-Supervised Learning," IEEE/CVF Conference on Computer Vision and Pattern Recognition, Jun. 18-23, 2018, 10 pages.

Wikipedia, "Knowledge Distillation," https://en.wikipedia.org/wiki/Knowledge_distillation, Mar. 30, 2021, 4 pages.

U.S. Appl. No. 17/318,568 filed in the name of Zijia Wang et al. on May 12, 2021, and entitled "Method, Electronic Device, and Computer Program Product for Data Distillation."

* cited by examiner

METHOD, ELECTRONIC DEVICE, AND COMPUTER PROGRAM PRODUCT FOR DATA PROCESSING

RELATED APPLICATION(S)

The present application claims priority to Chinese Patent Application No. 202110839222.2, filed Jul. 23, 2021, and entitled "Method, Electronic Device, and Computer Program Product for Data Processing," which is incorporated by reference herein in its entirety.

FIELD

Embodiments of the present disclosure relate to the field of data processing, and in particular, to a method, an electronic device, and a computer program product for data processing.

BACKGROUND

A machine learning model needs to use substantial amounts of data for training. Very large data sets may consume excessive computing resources during training. Moreover, labeling a large amount of data will also consume excessive labor. Therefore, there is a need for a method which can distill data sets to train a machine learning model using distilled small data sets, thereby reducing resource consumption and improving the efficiency of training.

SUMMARY

In a first aspect of the present disclosure, a method for data processing is provided. The method includes determining a first set of feature vectors representing samples in a data set. The method also includes generating a second set of feature vectors by performing a first transformation on the first set of feature vectors, wherein distribution skewness of the second set of feature vectors in a feature space is smaller than that of the first set of feature vectors. The method also includes generating a third set of feature vectors by performing a second transformation on the second set of feature vectors, wherein the third set of feature vectors and the second set of feature vectors have different distances between vectors. The method also includes selecting target samples as representatives from the samples based on a distribution of the third set of feature vectors in the feature space.

In a second aspect of the present disclosure, an electronic device is provided. The electronic device includes a processor and a memory coupled to the processor, the memory having instructions stored therein that, when executed by the processor, cause the device to execute actions. The actions include determining a first set of feature vectors representing samples in a data set. The actions also include generating a second set of feature vectors by performing a first transformation on the first set of feature vectors, wherein distribution skewness of the second set of feature vectors in a feature space is smaller than that of the first set of feature vectors. The actions also include generating a third set of feature vectors by performing a second transformation on the second set of feature vectors, wherein the third set of feature vectors and the second set of feature vectors have different distances between vectors. The actions also include selecting target samples as representatives from the samples based on a distribution of the third set of feature vectors in the feature space.

In a third aspect of the present disclosure, a computer program product is provided which is tangibly stored on a computer-readable medium and includes machine-executable instructions, wherein the machine-executable instructions, when executed, cause a machine to perform the method according to the first aspect.

In the embodiments of the present disclosure, by means of the solution of data processing of the present application, representative target samples can be selected from samples of a data set, thereby improving the efficiency of training.

This Summary is provided to introduce the selection of concepts in a simplified form, which will be further described in the Detailed Description below. The Summary is neither intended to identify key features or main features of the embodiments of the present disclosure, nor intended to limit the scope of the present disclosure.

BRIEF DESCRIPTION OF THE DRAWINGS

The above and other objectives, features, and advantages of embodiments of the present disclosure will become more apparent from detailed description herein of example embodiments of the present disclosure in in combination with the accompanying drawings. In the example embodiments of the present disclosure, the same reference numerals generally represent the same parts.

DETAILED DESCRIPTION

Principles of the embodiments of the present disclosure will be described below with reference to several example embodiments shown in the accompanying drawings. Although illustrative embodiments of the present disclosure are illustrated in the accompanying drawings, it should be understood that these embodiments are described only to enable those skilled in the art to better understand and then implement the embodiments of the present disclosure, and are not intended to impose any limitation to the scope of the present disclosure.

The term "include" and variants thereof used herein mean open-ended inclusion, that is, "include but not limited to." Unless specifically stated, the term "or" means "and/or". The term "based on" means "based at least in part on." The terms "an example embodiment" and "some embodiments" mean "at least one example embodiment." The term "another embodiment" means "at least one additional embodiment." The terms "first," "second," and the like may refer to different or identical objects. Other explicit and implicit definitions may also be included below.

As mentioned above, there is a need of a method which can distill data sets to train machine learning models using distilled small data sets. Conventional methods for distilling data sets are computationally intensive and have poor interpretability.

Embodiments of the present disclosure provide a solution for data processing. In this solution, a first set of feature vectors representing samples in a data set is determined. The solution also includes generating a second set of feature vectors by performing a first transformation on the first set of feature vectors, wherein distribution skewness of the second set of feature vectors in a feature space is smaller than that of the first set of feature vectors. The solution also includes generating a third set of feature vectors by performing a second transformation on the second set of feature vectors, wherein the third set of feature vectors and the second set of feature vectors have different distances between vectors. The solution also includes selecting target samples as representatives from the samples based on a distribution of the third set of feature vectors in the feature space. In this way, it is possible to select representative target samples from the samples of the data set for training, thereby improving the efficiency of training.

The basic principles and several example embodiments of the present disclosure are described below with reference to FIGS. 1 to 5. It should be understood that these example embodiments are given only to enable those skilled in the art to better understand and then implement the embodiments of the present disclosure, and are not intended to limit the scope of the present disclosure in any way.

Figure 1:
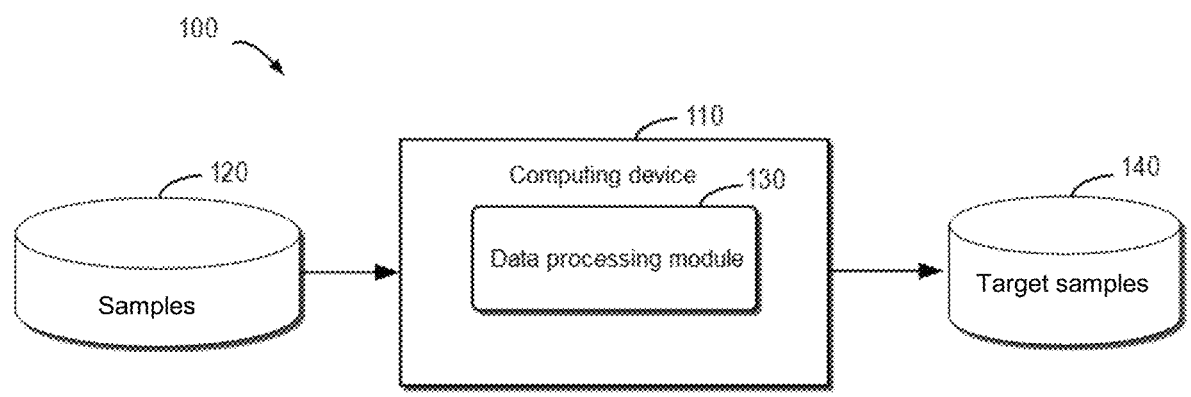
FIG. 1 illustrates a schematic diagram of an environment in which embodiments of the present disclosure may be implemented.

FIG. 1 illustrates environment 100 in which embodiments of the present disclosure may be implemented. As shown in FIG. 1, environment 100 includes computing device 110, samples 120 and target samples 140 in a data set. Data processing module 130 is deployed in computing device 110. Computing device 110 includes any computing device in the form of a general-purpose computing device. In some implementations, computing device 110 may be implemented as various user terminals or service terminals having computing capabilities. The service terminals may be servers provided by various service providers, large-scale computing devices, and the like. For example, the user terminals may be any type of mobile, fixed, or portable terminals, including a mobile phone, a site, a unit, a device, a multimedia computer, a multimedia tablet, an Internet node, a communicator, a desktop computer, a laptop computer, a notebook computer, a netbook computer, a tablet computer, a personal communication system (PCS) device, a personal navigation device, a personal digital assistant (PDA), an audio/video player, a digital camera/camcorder, a positioning device, a television receiver, a radio broadcast receiver, an e-book device, a gaming device, or any combination thereof, including accessories and peripherals of such devices, or any combination thereof.

Components of computing device 110 may include, but are not limited to, one or more processors or processing units, memories, storage devices, one or more communication units, one or more input devices, and one or more output devices. These components may be integrated on a single device or provided in the form of a cloud computing architecture. In the cloud computing architecture, these components may be remotely arranged and may work together to achieve the functions described in the present disclosure. In some implementations, cloud computing provides computing, software, data access, and storage services, which do not require terminal users to know physical locations or configurations of systems or hardware which provide these services. In various implementations, cloud computing provides services via a wide area network (e.g., the Internet) with appropriate protocols. For example, a cloud computing provider provides applications through a wide area network, and they are accessible through a web browser or any other computing components. Software or components of the cloud computing architecture and corresponding data may be stored on a server at a remote location. Computing resources in a cloud computing environment may be merged at a remote data center location, or they may be dispersed. Cloud computing infrastructures can provide services through a shared data center, even if they are each represented as a single access point for users. Therefore, the components and functions described herein may be provided from a service provider at a remote location by using the cloud computing architecture. Alternatively, they may also be provided from a conventional server, or they may be installed on a client terminal device directly or in other manners.

Computing device 110 may utilize data processing module 130 to implement a data processing method according to an embodiment of the present disclosure. As shown in FIG. 1, computing device 110 receives samples 120. Computing device 110 may receive samples 120 from other computing devices or storage devices through its input device. Samples 120 may be samples in a data set for training. Samples 120 may be in various forms, such as pictures, audio, video, and values. The data set may also include labels corresponding to samples 120. Examples of the labels may include categories of the pictures, the speaker identifier of the audio, and the like. Computing device 110 may utilize data processing module 130 to select target samples 140 from samples 120. The number of target samples 140 is smaller than the number of samples 120. Target samples 140 may be samples that are representative of samples 120. Target samples 140 may replace samples 120 for training to reduce the amount of training data while ensuring high training accuracy, thereby improving the efficiency of training. With the characteristic of representing samples 120 in a large data set, target samples 140 can be used for few-shot learning, less than one-shot learning, and the like. The details of selecting target samples 140 through data processing module 130 will be described below with reference to FIGS. 2-4.

It should be understood that environment 100 shown in FIG. 1 is merely illustrative and should not constitute any limitation to the functions and scope of the implementations described in the present disclosure. For example, computing device 110 may also receive samples 120 from a storage device integrated therewith.

Figure 2:
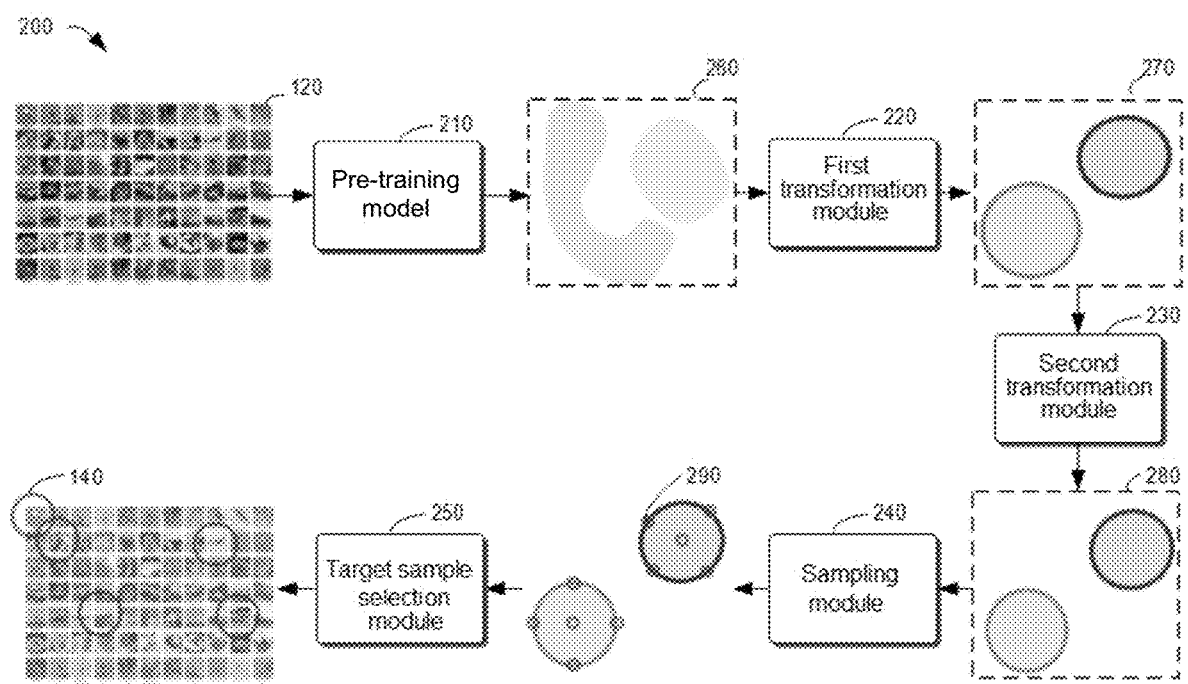
FIG. 2 illustrates a system architecture diagram for data processing according to some embodiments of the present disclosure.

FIG. 2 illustrates an architecture diagram of system 200 for data processing according to an embodiment of the present disclosure. System 200 may be implemented in computing device 110 shown in FIG. 1. As shown in FIG. 2, system 200 may include pre-training model 210, first transformation module 220, second transformation module 230, sampling module 240, and target sample selection module 250.

Pre-training model 210 receives samples 120 in a data set and determines first set of feature vectors 260 representing samples 120. FIG. 2 shows an example of samples 120 being pictures. Samples 120 can include multiple pictures, for example, hundreds of thousands to millions of pictures. Pre-training model 210 may be any suitable pre-training model, and the scope of the present disclosure is not limited in this regard. Pre-training model 210 is used to determine first set of feature vectors 260 representing samples 120. Each sample has a corresponding feature vector. For example, pre-training model 210 may be a deep neural network model, a convolutional neural network model, and the like.

First set of feature vectors 260 have a distribution in a feature space. FIG. 2 shows an example of the distribution of first set of feature vectors 260. It should be understood that the two-dimensional distribution shown in FIG. 2 is merely schematic. The actual distribution in the feature space depends on the dimension of first set of feature vectors 260. The distribution of first set of feature vectors 260 can be related to categories of the samples. As shown in FIG. 2, the distribution of first set of feature vectors 260 may be divided into (e.g., two) relatively separate distributions depending on the categories of samples 120 (e.g., two categories). It should be understood that, depending on the performance of pre-training model 210, the distribution of first set of feature vectors 260 may not be shown as completely separated independent distributions.

First transformation module 220 generates second set of feature vectors 270 by performing a first transformation on first set of feature vectors 260. The distribution skewness of second set of feature vectors 270 in the feature space is smaller than that of first set of feature vectors 260. As shown in FIG. 2, the distribution of first set of feature vectors 260 in the feature space may be irregular. The regularity of distribution can be characterized by distribution skewness. First transformation module 220 reduces the distribution skewness of first set of feature vectors 260 by performing a first transformation on first set of feature vectors 260. In some embodiments, first transformation module 220 may reduce the distribution skewness, in the feature space, of feature vectors in first set of feature vectors 260 that are associated with samples 120 of the same category in the data set. In other words, first transformation module 220 may reduce the distribution skewness of the samples of each category.

The first transformation can be any suitable transformation capable of reducing the distribution skewness of the feature vectors. In some embodiments, the first transformation can be exponentiation transformation or logarithm transformation. For example, the first transformation may be performed on first set of feature vectors 260 according to the Tukey power transformation described according to formula (1).

$$\hat{x} = \begin{cases} x^\lambda & \text{if } \lambda \neq 0 \\ \log(x) & \text{if } \lambda = 0 \end{cases} \quad (1)$$

where $\lambda$ is a hyper-parameter used to control the implementation of the first transformation. The smaller $\lambda$ is, the smaller the positive skewness of the distribution is (less positively skewed). Conversely, the larger $\lambda$ is, the greater the positive skewness of the distribution is. When $\lambda$ is 1, first set of feature vectors 260 maintains the original distributed skewness.

As shown in FIG. 2, second set of feature vectors 270 determined via the first transformation has smaller distribution skewness than first set of feature vectors 260, i.e., the distribution of second set of feature vectors 270 is more regular. For example, the distribution of second set of feature vectors 270 may be a more regular Gaussian-like distribution.

Second transformation module 230 generates third set of feature vectors 280 by performing a second transformation on second set of feature vectors 270. Third set of feature vectors 280 and second set of feature vectors 270 have different distances between vectors. The distances between vectors may be Euclidean distances between vectors. The distances between vectors may also be Manhattan distances between vectors.

In some embodiments, performing the second transformation includes reducing distances between the feature vectors in second set of feature vectors 270 that are associated with samples 120 of the same category in the data set. In other words, second transformation module 230 may reduce distances between feature vectors of samples of the same category by performing the second transformation. For example, for second set of feature vectors 270 in a Gaussian-like distribution, performing the second transformation may reduce the variance of the distribution. Alternatively or additionally, performing the second transformation includes increasing distances between feature vectors in second set of feature vectors 270 that are associated with samples 120 of different categories in the data set. In other words, second transformation module 230 may increase distances between feature vectors of samples of different categories by performing the second transformation. For example, for second set of feature vectors 270 in a Gaussian-like distribution, performing the second transformation may increase a distance between a first mean value of feature vectors of samples of the first category and a second mean value of feature vectors of samples of the second category.

Figure 3:
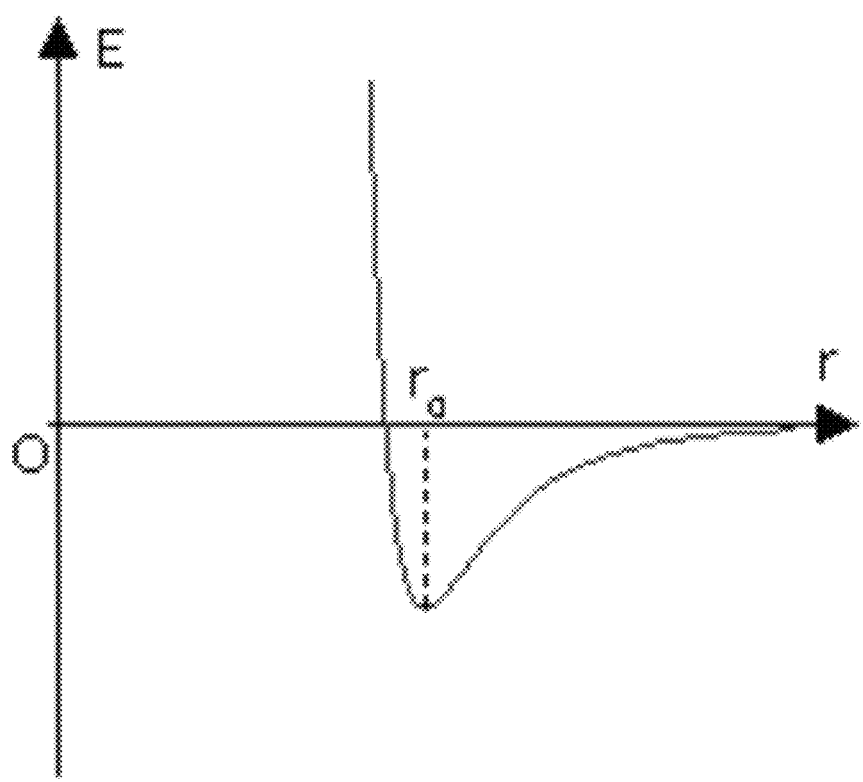
FIG. 3 illustrates a schematic diagram of a relationship between potential energy and a distance between vectors according to some embodiments of the present disclosure.

The second transformation may be any suitable transformation capable of adjusting a distance between feature vectors. In some embodiments, distances between second set of feature vectors 270 may be adjusted based on a potential energy minimization method for adjusting the distance between molecules. For example, the relationship between potential energy and a distance between two feature vectors may be represented by using formula (2).

$$E = \frac{1}{r^2} - \frac{1}{r^3} \quad (2)$$

where E represents potential energy; and r represents the distance between feature vectors. FIG. 3 illustrates a schematic diagram of the relationship between potential energy and the distance between vectors described in the formula (2). As shown in FIG. 3, when the distance between vectors is $r_0$, potential energy E is the smallest. Therefore, the distance $r_0$ between the two vectors may be referred as the optimal distance.

In some embodiments, the optimal distance between second set of feature vectors 270 may be determined by using formula (3).

$$L = \sum_i^N \sum_j^{N-1} \left[ \frac{1}{(d_{ij} + \lambda)^2} - \frac{1}{(d_{ij} + \lambda)^3} \right] \quad (3)$$

where L is a loss function; N is the number of samples 120; $d_{ij}=\text{dis}(W_T f_i, W_T f_j)$ indicates the distance between vector $W_T f_i$ and vector $W_T f_j$ and dis( ) indicates a function calculating the distance between vector $W_T f_i$ and vector $W_T f_j$, for example, a function for calculating the Euclidean distance; $W_T$ is a weight matrix for performing a second transformation on second set of feature vectors 270, and is a learnable parameter; and $\lambda$, is a hyper-parameter (different from $\lambda$ in the formula (1)) that can depend on categories of the samples. For sample i and sample j of the same category, large λ (e.g., 10) may be set. Conversely, small λ (e.g., 1) can be set for sample i and sample j of different categories.

Still referring to FIG. 2, second transformation module 230 may determine the value of weight matrix $W_T$ by minimizing loss function L which is based on second set of feature vectors 270, weight matrix $W_T$, and categories of samples 120. Second transformation module 230 may determine products of second set of feature vectors 270 and the determined weight matrix $W_T$ as third set of feature vectors 280. As described above, third set of feature vectors 280 and second set of feature vectors 270 have different distances between vectors. Compared with second set of feature vectors 270, the distances between feature vectors of the same category in third set of feature vectors 280 may be smaller, and the distances between feature vectors of different categories in third set of feature vectors 280 may be larger. As shown in FIG. 2, compared with second set of feature vectors 270, the variance of Gaussian-like distribution of feature vectors associated with samples of the same category in third set of feature vectors 280 is reduced, and the distance between the first mean value of feature vectors of samples of the first category and the second mean value of feature vectors of samples of the second category is increased.

Sampling module 240 can select target feature vectors 290 from third set of feature vectors 280 based on determined third set of feature vectors 280. Target samples 140 corresponding to target feature vectors 290 may be used to represent samples 120. Sampling module 240 may sample target feature vectors 290 based on the distribution of third set of feature vectors 280. Target feature vectors 290 may include at least one feature vector. Sampling module 240 may select feature vectors at the center of the distribution of third set of feature vectors 280 as target feature vectors 290. Alternatively or additionally, sampling module 240 may select feature vectors located at the edge of the distribution of third set of feature vectors 280 as target feature vectors 290. An example of target feature vectors 290 is shown in small circles in FIG. 2. As shown in FIG. 2, target feature vectors 290 may be located at the center or edge of the distribution.

In some embodiments, sampling module 240 may determine the mean value of feature vectors in third set of feature vectors 280 that are associated with samples 120 of the first category in the data set. Based on the mean value, sampling module 240 may sample target feature vectors 290 from the feature vectors associated with the samples of the first category. Sampling module 240 may select a feature vector in third set of feature vectors 280 that is the closest to the mean value as a center feature vector in target feature vectors 290. Sampling module 240 may calculate a feature vector in third set of feature vectors 280 that is the farthest from the center feature vector as an edge feature vector in target feature vectors 290.

Alternatively or additionally, sampling module 240 may utilize the unscented Kalman filter (UKF) algorithm to sample target feature vectors 290 based on the mean value. For the samples of each category, target feature vectors 290 may be sampled in accordance with formula (4).

$$S[i] = \begin{cases} \mu + V_i & i = 1, \ldots, n-1 \\ \mu + V_{i-n} & i = n, \ldots, 2n \end{cases} \quad (4)$$

where S[i] represents sampled target feature vectors 290; µ represents a mean value of feature vectors in third set of feature vectors 280 that are associated with samples of one category; $V=\sqrt{(n+\lambda)\Sigma}$, represents a variance matrix; $V_i$ represents the $i^{th}$ column of the variance matrix; n represents the dimension of the feature vectors; λ is a presettable zoom parameter ((different from λ in formulas (1) and (2)), indicating a distance between a sampling point and the center of the distribution; and Σ is a covariance matrix of third set of feature vectors 280.

Based on target feature vectors 290, target sample selection module 250 may determine the samples associated with target feature vectors 290 as target samples 140 representing samples 120. Specifically, for each category, target sample selection module 250 may determine the samples associated with target feature vectors 290 as target samples 140 which represent samples 120 of the corresponding category. As shown in FIG. 2, target sample selection module 250 may select target samples 140 (shown in large circles) from samples 120.

Alternatively or additionally, sampling module 240 may determine an estimated distribution of third set of feature vectors 280 based on target feature vectors 290. Specifically, sampling module 240 may determine, based on target feature vectors 290 for each category, an estimated distribution of feature vectors in third set of feature vectors 280 that are associated with samples of the corresponding category. The estimated distribution can be represented by a mathematical expression. For example, for a Gaussian-like distribution, the estimated distribution may be represented by a mean value and a variance. Based on the mathematical expression of the estimated distribution, sampling module 240 may determine additional target feature vectors. The additional target feature vectors may not be the same as any feature vector in third set of feature vectors 280, but may represent third set of feature vectors 280. Additional samples may be generated based on the additional target feature vectors by using additional neural network modules. The additional samples may be used to represent samples 120.

Figure 4:
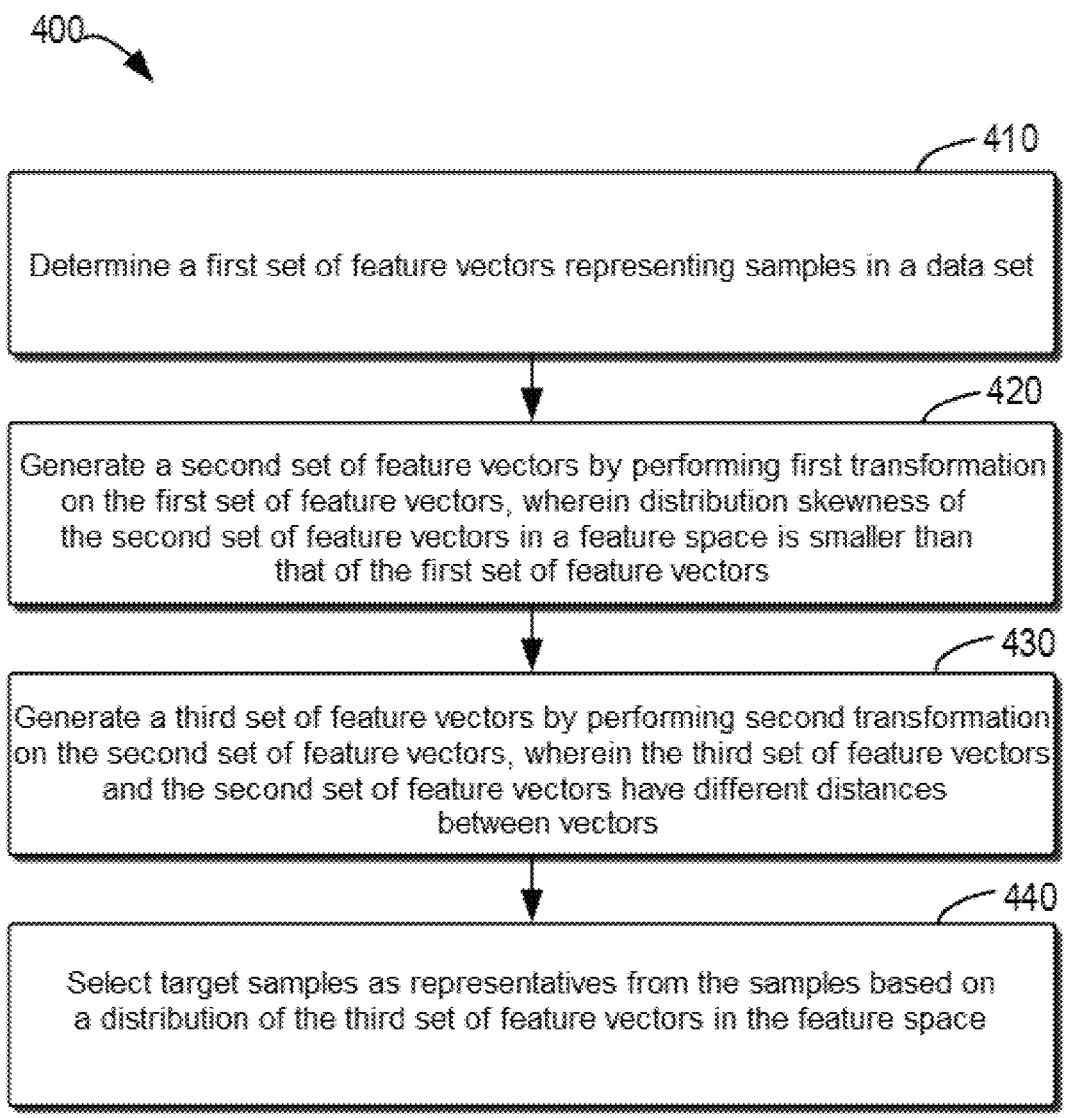
FIG. 4 illustrates a flow chart of an example method for data processing according to some embodiments of the present disclosure.

FIG. 4 illustrates a flow chart of example method 400 for data processing according to some embodiments of the present disclosure. Method 400 may be implemented, for example, in environment 100 as shown in FIG. 1. It should be understood that method 400 may further include additional actions which are not shown and/or may omit actions which are shown. The scope of the present disclosure is not limited in this regard.

At block 410, a first set of feature vectors representing samples 120 in a data set is determined. First set of feature vectors 260 may be determined by using pre-training model 210.

At block 420, second set of feature vectors 270 is generated by performing a first transformation on first set of feature vectors 260, and distribution skewness of second set of feature vectors 270 is smaller than that of first set of feature vectors 260. In some embodiments, performing the first transformation includes reducing distribution skewness, in a feature space, of feature vectors in first set of feature vectors 260 that are associated with samples of the same category in the data set. In some embodiments, the first transformation includes exponentiation transformation or logarithm transformation.

At block 430, third set of feature vectors 280 is generated by performing a second transformation on second set of feature vectors 270, and third set of feature vectors 280 and second set of feature vectors 270 have different distances between vectors. In some embodiments, performing the second transformation includes at least one of the following: reducing distances between feature vectors in second set of feature vectors 270 that are associated with samples of the same category in the data set; and increasing distances between feature vectors in second set of feature vectors 270 that are associated with samples of different categories in the data set. In some embodiments, performing the second transformation includes: determining a weight matrix by minimizing a loss function which is based on second set of feature vectors 270, the weight matrix, and categories of the samples; and determining products of second set of feature vectors 270 and the determined weight matrix as third set of feature vectors 280.

At block 440, target samples 140 as representatives are selected from the samples based on a distribution of third set of feature vectors 280 in the feature space. In some embodiments, selecting target samples 140 based on the distribution of third set of feature vectors 280 in the feature space includes: determining a mean value of feature vectors in third set of feature vectors 280 that are associated with samples of a first category in the data set; based on the mean value, sampling target feature vectors 290 from the feature vectors associated with the samples of the first category; and determining samples associated with the target feature vectors as target samples 140 representing the samples of the first category. In some embodiments, sampling target feature vectors 290 based on the mean value includes: sampling target feature vectors 290 based on the mean value by means of the unscented Kalman filter algorithm.

In some embodiments, the method further includes determining, based on the target feature vectors, an estimated distribution of feature vectors in third set of feature vectors 280 that are associated with the samples of the first category in the data set; determining additional target feature vectors based on the estimated distribution; and determining additional target samples for representing the samples of the first category based on the additional target feature vectors.

In this way, it is possible to select representative and fewer target samples 140 from samples 120 of the data set for training, thereby reducing resource consumption to improve the efficiency of training. Further, with the characteristic of representing samples 120 in a large data set, target samples 140 can be used to migrate learning, few-shot learning, less than one-shot learning, etc.

Figure 5:
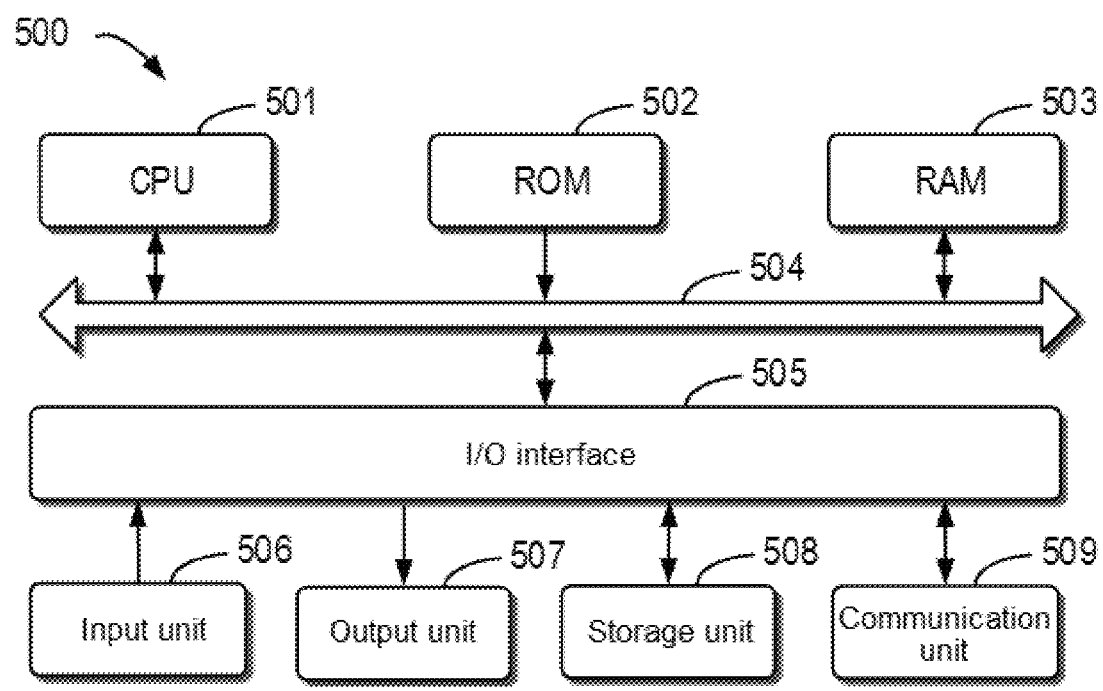
FIG. 5 illustrates a block diagram of an example computing device which can be used to implement embodiments of the present disclosure.

FIG. 5 illustrates a schematic block diagram of example device 500 which can be used to implement embodiments of the present disclosure. For example, device 500 may be implemented at environment 100 as shown in FIG. 1. As shown in FIG. 5, device 500 includes central processing unit (CPU) 501 which may perform various appropriate actions and processing according to computer program instructions stored in read-only memory (ROM) 502 or computer program instructions loaded from storage unit 508 to random access memory (RAM) 503. Various programs and data required for the operation of device 500 may also be stored in RAM 503. CPU 501, ROM 502, and RAM 503 are connected to each other through bus 504. Input/output (I/O) interface 505 is also connected to bus 504.

A plurality of components in device 500 are connected to I/O interface 505, including: input unit 506, such as a keyboard and a mouse; output unit 507, such as various types of displays and speakers; storage unit 508, such as a magnetic disk and an optical disc; and communication unit 509, such as a network card, a modem, and a wireless communication transceiver. Communication unit 509 allows device 500 to exchange information/data with other devices via a computer network, such as the Internet, and/or various telecommunication networks.

Various processes and processing described above, for example, method 400, may be performed by CPU 501. For example, in some embodiments, method 400 may be implemented as computer software programs which are tangibly included in a machine-readable medium such as storage unit 508. In some embodiments, part or all of the computer programs may be loaded and/or installed to device 500 via ROM 502 and/or communication unit 509. When the computer program is loaded into RAM 503 and executed by CPU 501, one or more actions of method 400 described above may be performed.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device which may hold and store instructions used by an instruction-executing device. For example, the computer-readable storage medium may be, but is not limited to, an electric storage device, a magnetic storage device, an optical storage device, an electromagnetic storage device, a semi-conductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), an SRAM, a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from the computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming language such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described here with reference to flow charts and/or block diagrams of the method, the apparatus (system), and the computer program product implemented according to the embodiments of the present disclosure. It should be understood that each block of the flow charts and/or the block diagrams and combinations of blocks in the flow charts and/or the block diagrams may be implemented by the computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flow charts as well as a combination of blocks in the block diagrams and/or flow charts may be implemented by using a special hardware-based system which executes specified functions or actions, or implemented by using a combination of special hardware and computer instructions.

Example embodiments of the present disclosure have been described above. The above description is illustrative, rather than exhaustive, and is not limited to the disclosed various embodiments. Numerous modifications and alterations are apparent to those of ordinary skill in the art without departing from the scope and spirit of the illustrated embodiments. The selection of terms used herein is intended to best explain the principles and practical applications of the various embodiments or the improvements to technologies on the market, so as to enable persons of ordinary skill in the art to understand the embodiments disclosed here.

What is claimed is:

1. A method for data processing, comprising:

determining, in a first machine learning model of a first architectural stage in a multi-stage serial processing architecture of a processor-based machine learning system, a first set of feature vectors representing samples in a data set;

generating, in a second architectural stage in the multi-stage serial processing architecture of the processor-based machine learning system, a second set of feature vectors by performing a first transformation on the first set of feature vectors, wherein distribution skewness of the second set of feature vectors in a feature space is smaller than that of the first set of feature vectors;

generating, in a third architectural stage in the multi-stage serial processing architecture of the processor-based machine learning system, a third set of feature vectors by performing a second transformation on the second set of feature vectors, wherein the third set of feature vectors and the second set of feature vectors have different distances between vectors, and wherein the second transformation utilizes a loss function based on potential energy minimization, and in computing the loss function the second transformation is configured to iteratively combine results of application of a potential energy function to distances between respective pairs of feature vectors in the second set of feature vectors;

selecting, utilizing a series arrangement of fourth and fifth architectural stages in the multi-stage serial processing architecture of the processor-based machine learning system, target samples as representatives from the samples based on a distribution of the third set of feature vectors in the feature space, the selected target samples providing a distilled data set for use in training a second machine learning model of the processor-based machine learning system, wherein the fourth architectural stage implements a designated processor-based filter utilizing a hardware processor;

storing the selected target samples of the distilled data set as a replacement for the samples in the data set to reduce resource consumption in the processor-based machine learning system; and training the second machine learning model of the processor-based machine learning system utilizing the distilled data set that replaces the samples in the data set, to achieve at least a portion of the reduced resource consumption in conjunction with the training.

2. The method according to claim 1, wherein performing the first transformation comprises:
reducing distribution skewness, in the feature space, of feature vectors in the first set of feature vectors that are associated with samples of a same category in the data set.

3. The method according to claim 1, wherein the first transformation comprises:
exponentiation transformation; or
logarithm transformation.

4. The method according to claim 1, wherein performing the second transformation comprises:
reducing distances between feature vectors in the second set of feature vectors that are associated with samples of a same category in the data set; and/or
increasing distances between feature vectors in the second set of feature vectors that are associated with samples of different categories in the data set.

5. The method according to claim 1, wherein performing the second transformation comprises:
determining a weight matrix by minimizing a loss function which is based on the second set of feature vectors, the weight matrix, and categories of the samples; and
determining products of the second set of feature vectors and the determined weight matrix as the third set of feature vectors.

6. The method according to claim 1, wherein selecting the target samples based on a distribution of the third set of feature vectors in the feature space comprises:
determining a mean value of feature vectors in the third set of feature vectors that are associated with samples of a first category in the data set;
based on the mean value, sampling target feature vectors from the feature vectors associated with the samples of the first category; and
determining samples associated with the target feature vectors as target samples representing the samples of the first category.

7. The method according to claim 6, wherein sampling the target feature vectors based on the mean value comprises:
sampling the target feature vectors based on the mean value by means of an unscented Kalman filter algorithm.

8. The method according to claim 7, further comprising:
determining, based on the target feature vectors, an estimated distribution of feature vectors in the third set of feature vectors that are associated with the samples of the first category in the data set;
determining additional target feature vectors based on the estimated distribution; and
determining additional target samples for representing the samples of the first category based on the additional target feature vectors.

9. An electronic device, comprising:
at least one processor; and
memory coupled to the processor, wherein the memory has instructions stored therein that, when executed by the processor, cause the electronic device to execute actions comprising:
determining, in a first machine learning model of a first architectural stage in a multi-stage serial processing architecture of a processor-based machine learning system, a first set of feature vectors representing samples in a data set;
generating, in a second architectural stage in the multi-stage serial processing architecture of the processor-based machine learning system, a second set of feature vectors by performing a first transformation on the first set of feature vectors, wherein distribution skewness of the second set of feature vectors in a feature space is smaller than that of the first set of feature vectors;
generating, in a third architectural stage in the multi-stage serial processing architecture of the processor-based machine learning system, a third set of feature vectors by performing a second transformation on the second set of feature vectors, wherein the third set of feature vectors and the second set of feature vectors have different distances between vectors, and wherein the second transformation utilizes a loss function based on potential energy minimization, and in computing the loss function the second transformation is configured to iteratively combine results of application of a potential energy function to distances between respective pairs of feature vectors in the second set of feature vectors;
selecting, utilizing a series arrangement of fourth and fifth architectural stages in the multi-stage serial processing architecture of the processor-based machine learning system, target samples as representatives from the samples based on a distribution of the third set of feature vectors in the feature space, the selected target samples providing a distilled data set for use in training a second machine learning model of the processor-based machine learning system, wherein the fourth architectural stage implements a designated processor-based filter utilizing a hardware processor;
storing the selected target samples of the distilled data set as a replacement for the samples in the data set to reduce resource consumption in the processor-based machine learning system; and
training the second machine learning model of the processor-based machine learning system utilizing the distilled data set that replaces the samples in the data set, to achieve at least a portion of the reduced resource consumption in conjunction with the training.

10. The electronic device according to claim 9, wherein performing the first transformation comprises:
reducing distribution skewness, in the feature space, of feature vectors in the first set of feature vectors that are associated with samples of a same category in the data set.

11. The electronic device according to claim 9, wherein the first transformation comprises:
exponentiation transformation; or
logarithm transformation.

12. The electronic device according to claim 9, wherein performing the second transformation comprises:
reducing distances between feature vectors in the second set of feature vectors that are associated with samples of a same category in the data set; and/or
increasing distances between feature vectors in the second set of feature vectors that are associated with samples of different categories in the data set.

13. The electronic device according to claim 9, wherein performing the second transformation comprises:
determining a weight matrix by minimizing a loss function which is based on the second set of feature vectors, the weight matrix, and categories of the samples; and
determining products of the second set of feature vectors and the determined weight matrix as the third set of feature vectors.

14. The electronic device according to claim 9, wherein selecting the target samples based on a distribution of the third set of feature vectors in the feature space comprises:
- determining a mean value of feature vectors in the third set of feature vectors that are associated with samples of a first category in the data set;
- based on the mean value, sampling target feature vectors from the feature vectors associated with the samples of the first category; and
- determining samples associated with the target feature vectors as target samples representing the samples of the first category.

15. The electronic device according to claim 14, wherein sampling the target feature vectors based on the mean value comprises:
- sampling the target feature vectors based on the mean value by means of an unscented Kalman filter algorithm.

16. The electronic device according to claim 15, wherein the actions further comprise:
- determining, based on the target feature vectors, an estimated distribution of feature vectors in the third set of feature vectors that are associated with the samples of the first category in the data set;
- determining additional target feature vectors based on the estimated distribution; and
- determining additional target samples for representing the samples of the first category based on the additional target feature vectors.

17. A computer program product tangibly stored on a computer-readable medium and comprising machine-executable instructions, wherein the machine-executable instructions, when executed, cause a machine to perform a method for data processing, the method comprising:
- determining, in a first machine learning model of a first architectural stage in a multi-stage serial processing architecture of a processor-based machine learning system, a first set of feature vectors representing samples in a data set;
- generating, in a second architectural stage in the multi-stage serial processing architecture of the processor-based machine learning system, a second set of feature vectors by performing a first transformation on the first set of feature vectors, wherein distribution skewness of the second set of feature vectors in a feature space is smaller than that of the first set of feature vectors;
- generating, in a third architectural stage in the multi-stage serial processing architecture of the processor-based machine learning system, a third set of feature vectors by performing a second transformation on the second set of feature vectors, wherein the third set of feature vectors and the second set of feature vectors have different distances between vectors, and wherein the second transformation utilizes a loss function based on potential energy minimization, and in computing the loss function the second transformation is configured to iteratively combine results of application of a potential energy function to distances between respective pairs of feature vectors in the second set of feature vectors;
- selecting, utilizing a series arrangement of fourth and fifth architectural stages in the multi-stage serial processing architecture of the processor-based machine learning system, target samples as representatives from the samples based on a distribution of the third set of feature vectors in the feature space, the selected target samples providing a distilled data set for use in training a second machine learning model of the processor-based machine learning system, wherein the fourth architectural stage implements a designated processor-based filter utilizing a hardware processor;
- storing the selected target samples of the distilled data set as a replacement for the samples in the data set to reduce resource consumption in the processor-based machine learning system; and
- training the second machine learning model of the processor-based machine learning system utilizing the distilled data set that replaces the samples in the data set, to achieve at least a portion of the reduced resource consumption in conjunction with the training.

18. The computer program product according to claim 17, wherein performing the first transformation comprises:
- reducing distribution skewness, in the feature space, of feature vectors in the first set of feature vectors that are associated with samples of a same category in the data set.

19. The computer program product according to claim 17, wherein the first transformation comprises:
- exponentiation transformation; or
- logarithm transformation.

20. The computer program product according to claim 17, wherein performing the second transformation comprises:
- reducing distances between feature vectors in the second set of feature vectors that are associated with samples of a same category in the data set; and/or
- increasing distances between feature vectors in the second set of feature vectors that are associated with samples of different categories in the data set.

* * * * *